United States Patent [19]

Hasegawa et al.

[11] Patent Number: 4,491,107
[45] Date of Patent: Jan. 1, 1985

[54] IDLING RPM FEEDBACK CONTROL METHOD FOR INTERNAL COMBUSTION ENGINES

[75] Inventors: Shumpei Hasegawa, Niiza; Noriyuki Kishi, Itabashi; Takashi Koumura, Iruma, all of Japan

[73] Assignee: Honda Motor Co., Ltd., Tokyo, Japan

[21] Appl. No.: 479,217

[22] Filed: Mar. 28, 1983

[30] Foreign Application Priority Data

Apr. 2, 1982 [JP] Japan ................................ 57-55085

[51] Int. Cl.³ .............................................. F02D 1/04
[52] U.S. Cl. ..................................... 123/339; 123/585
[58] Field of Search ............... 123/339, 585, 389, 588, 123/349, 586, 371, 320; 73/364

[56] References Cited

U.S. PATENT DOCUMENTS

| | | | |
|---|---|---|---|
| 4,056,682 | 11/1977 | Noihes ................................ | 123/339 |
| 4,203,395 | 5/1980 | Cromas et al. ...................... | 123/339 |
| 4,406,262 | 9/1983 | Ikeura .................................. | 123/339 |

Primary Examiner—Raymond A. Nelli
Attorney, Agent, or Firm—Arthur L. Lessler

[57] ABSTRACT

An idling rpm feedback control method for controlling the quantity of supplementary air being supplied to an internal combustion engine, in a feedback manner, responsive to the difference between actual engine rpm and the desired idling rpm. When the engine rpm drops to a predetermined rpm being the upper limit of the desired idling rpm, the above feedback control is initiated. When the engine is decelerated with the throttle valve fully closed, and before the feedback control is started, the supplementary air quantity is controlled in decelerating mode in a predetermined manner while the engine speed drops from a predetermined rpm larger than the upper limit of the desired idling rpm to the same upper limit. In case deceleration is continued without disengagement of the power transmission means of the engine, even if the engine rpm drops below the above upper limit of the desired idling rpm, deceleration mode control of the quantity of supplementary air is continued until the power transmission means is disengaged.

6 Claims, 5 Drawing Figures

IDLING RPM FEEDBACK CONTROL METHOD FOR INTERNAL COMBUSTION ENGINES

BACKGROUND OF THE INVENTION

This invention relates to an idling rpm feedback control method for internal combustion engines, and more particularly to a method of this kind which is adapted to perform the rpm control in different manners dependent on the state of engagement of the power transmission means of the engine, when the engine is decelerating with the throttle valve fully closed and the engine rpm has fallen into the feedback control range, to thereby improve the fuel consumption and enhance the driveability of the engine.

In an internal combustion engine, the engine can easily stall due to a drop in the engine speed when the engine is operated in an idling condition at a low temperature of the engine cooling water or when the engine is heavily loaded with demands by the head lamps, air conditioner, etc., in a vehicle equipped with the engine. To eliminate such a disadvantage, an idling rpm feedback control method has been proposed (e.g. by Japanese patent provisional publication (Kokai) No. 55-98628), which comprises setting desired idling rpm in dependence upon load on the engine, detecting the difference between actual engine rpm and the desired idling rpm, and supplying a quantity of supplementary air to the engine in a manner responsive to a detected difference, to thereby control the engine rpm to the desired idling rpm.

According to this proposed method, if the idling rpm feedback control is carried out immediately when the engine is decelerated toward the desired idling rpm region and before the engine speed drops to the desired idling rpm region, the resulting controlled quantity of supplementary air is much smaller than a required quantity to be supplied to the engine, because on such occasions the supplementary air quantity is controlled to such a small value as to immediately bring the engine rpm to the desired idling rpm. If on such occasions the clutch of the engine is disengaged, there occurs a sudden drop in the engine speed, which can cause the engine to stall.

To avoid this disadvantage, an idling rpm feedback control method has been proposed, e.g. by Japanese patent provisional publication (KOKAI) No. 55-98629. According to this proposed method, in transition from a decelerating condition to an idling rpm feedback controlling condition, the quantity of supplementary air is controlled in decelerating mode, wherein supplementary air is previously supplied to the engine in a quantity gradually increasing with a drop in the engine speed before the idling rpm feedback control is started, to thereby ensure the smooth transition to the idling operation.

However, even if the above control manner is followed, sometimes the driver will maintain the clutch in an engaged state until the engine is about to stall, when the engine is decelerating with the throttle valve fully closed, and the engine speed drops below the engine rpm at which the idling rpm feedback control is initiated.

Even then, as the aforesaid feedback control manner is applied, the quantity of supplementary air supplied to the engine increases with a decrease in the engine rpm so as to bring the engine rpm closer to the desired idling rpm. As the quantity of supplementary air supplied is increased in this manner, if the clutch is disengaged, the engine load can suddenly drop, resulting in a sudden increase in the engine speed, which in turn can cause not only discomfort to the driver, but also can badly affect the fuel consumption and exhaust gas emission characteristics of the engine.

SUMMARY OF THE INVENTION

It is the object of this invention to provide an idling feedback control method which is adapted to control the quantity of supplementary air to be supplied to the engine in a predetermined deceleration mode, even if the engine rpm drops below a predetermined upper limit of the desired idling rpm when the engine is decelerating with the throttle valve fully closed, as long as the power transmission means that transmits the torque of the engine to the wheels continues to remain in a state of engagement, to thereby prevent a sudden increase in the engine rpm upon disengagement of the power transmission means.

According to this invention, a method is provided for controlling the quantity of supplementary air being supplied to the engine through an air passage one end of which communicates with the intake passage of the engine at a location downstream of a throttle valve arranged therein and the other end with the atmosphere. When the engine is decelerating with the throttle valve fully closed, from the time the engine rpm has fallen below a first predetermined rpm to the time the engine rpm reaches a second predetermined rpm, which is the upper limit of the desired idling rpm, and which is lower than the above first predetermined rpm, the quantity of supplementary air being supplied to the engine is controlled in a predetermined deceleration mode. But, once the above second predetermined rpm is reached, the quantity of supplementary air is controlled in feedback mode in a manner responsive to the difference between actual engine rpm and the desired idling rpm.

The method, according to the invention, is characterised by the following steps:

a. determining whether or not the power transmission means that transmits the torque of the engine to the wheels is in a state of engagement.

b. continuing the control of the quantity of supplementary air being supplied to the engine in deceleration mode, if the power transmission means is maintained in a state of engagement, even after the engine rpm has fallen below the above second predetermined rpm.

c. starting feedback mode control of the supplementary air quantity once the power transmission means has disengaged.

Preferably, the power transmission means includes a clutch and/or a transmission gear. Detection of the state of engagement of either one of the clutch or the transmission gear amounts to detection of the state of engagement of the power transmission means.

The above and other objects, features and advantages of the invention will be more apparent from the ensuing detailed description taken in conjunction with the accompanying drawings.

DETAILED DESCRIPTION

The method of the invention will now be described in detail with reference to the accompanying drawings.

Figure 1:
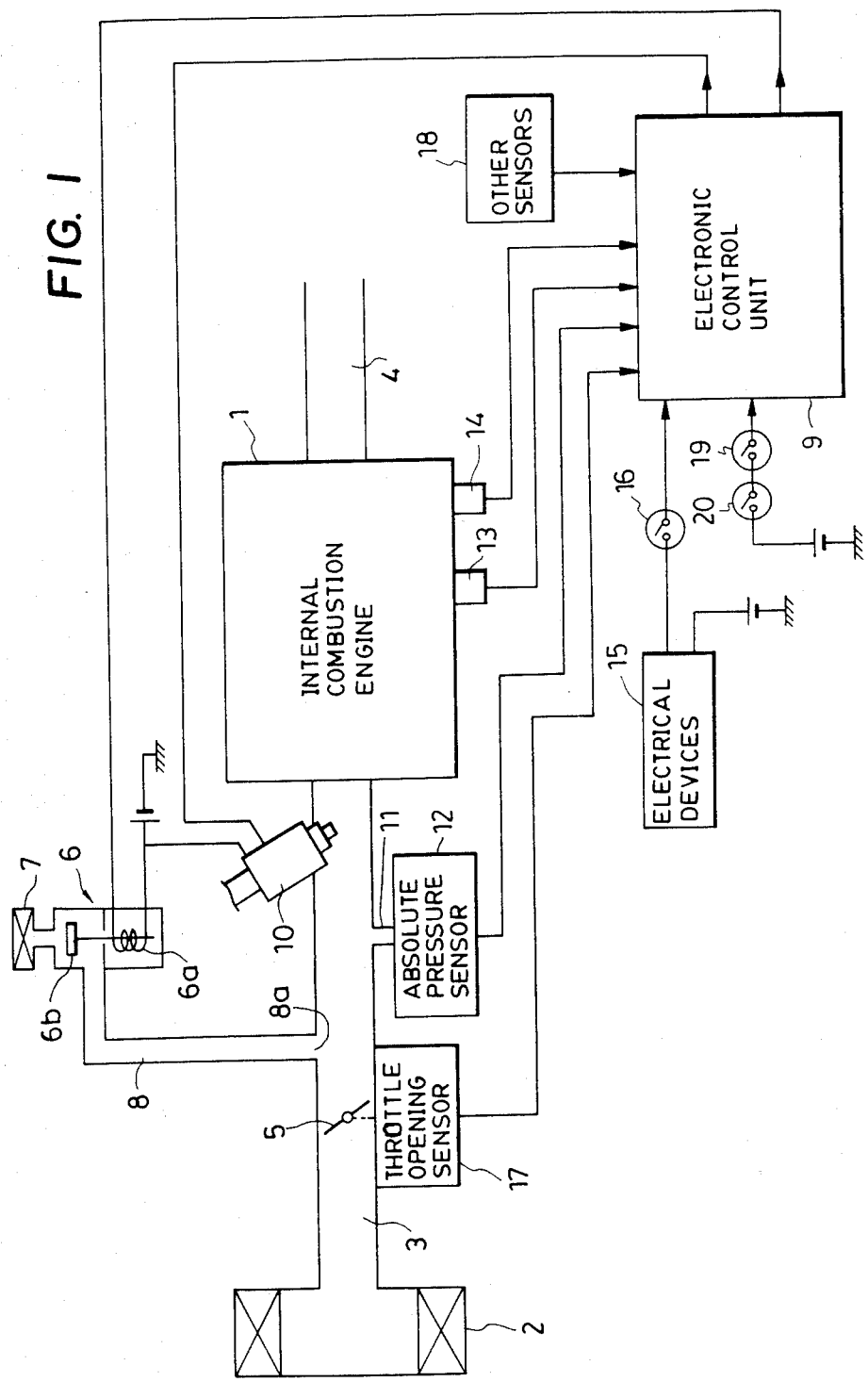
FIG. 1 is a block diagram illustrating the whole arrangement of an idling rpm feedback control system to which is applicable the method of this invention.

Referring first to FIG. 1, an idling rpm feedback control system is schematically illustrated, to which is applicable the method of the invention. In FIG. 1, reference numeral 1 designates an internal combustion engine which may be a four-cylinder type, and to which are connected an intake pipe 3 with an air cleaner 2 mounted at its open end and an exhaust pipe 4, at an intake side and an exhaust side of the engine 1, respectively. A throttle valve 5 is arranged within the intake pipe 3, and an air passage 8 opens at its one end 8a in the intake pipe 3 at a location downstream of the throttle valve 5. The air passage 8 has its other end communicating with the atmosphere and provided with an air cleaner 7. A supplementary air quantity control valve (hereinafter called merely "the control valve") 6 is arranged across the air passage 8 to control the quantity of supplementary air being supplied to the engine 1 through the air passage 8. This control valve 6 is a normally closed type and comprises a solenoid 6a and a valve 6b disposed to open the air passage 8 when the solenoid 6a is energized. The solenoid 6a is electrically connected to an electronic control unit (hereinafter called "ECU") 9. A fuel injection valve 10 is arranged in a manner projected into the intake pipe 3, at a location between the engine 1 and the open end 8a of the air passage 8, and is connected to a fuel pump, not shown, and also electrically connected to the ECU 9.

A throttle valve opening sensor 17 is mounted on the throttle valve 5, and an absolute pressure sensor 12 is provided in communication with the intake pipe 3 through a conduit 11 at a location downstream of the open end 8a of the air passage 8, while an engine cooling water temperature sensor 13 and an engine rpm sensor 14 are both mounted on the body of the engine 1. All the sensors and other sensors 18 for detecting other parameters of the operating condition of the engine 1 are electrically connected to the ECU 9. Reference numeral 15 designates electric devices such as head lamps and an air conditioner, which are electrically connected to the ECU 9 by way of a switch 16.

In FIG. 1, reference numeral 19 designates a switch which detects whether or not the clutch, not shown, of the engine is in a state of engagement, and generates an "ON" signal indicative of the closed position when the clutch is in a state of engagement, and reference numeral 20 designates a switch which detects whether or not the transmission gear is in a neutral position, and generates an "ON" signal indicative of the closed position when the transmission gear is in one of positions other than the neutral position. The two switches are connected in series to the ECU.

The idling rpm feedback control system constructed as above operates as follows: Engine operation parameter signals generated by the throttle valve opening sensor 17, the absolute pressure sensor 12, the engine cooling water temperature sensor 13, the engine rpm sensor 14 and the other sensors 18 are supplied to the ECU 9. The ECU 9 is also supplied with an "ON" signal generated when both of the switches 19 and 20 are closed, and an "OFF" signal generated when one of the switches is opened. Then, the ECU 9 determines the operating conditions of the engine 1 and the electrical loads on the same on the basis of the read values of these engine operation parameters, signals indicative of the on and off states of the switches 19 and 20 and a signal indicative of the electrical loads on the engine supplied to the ECU 9 from the electrical devices 15, and then calculates a desired quantity of fuel to be supplied to the engine 1, that is, a desired valve opening period of the fuel injection valve 10, and also a desired quantity of supplementary air to be supplied to the engine 1, that is, a desired valve opening period of the control valve 6, on the basis of the determined operating conditions of the engine and the electrical loads on the same. Then, the ECU supplies driving pulses corresponding to the calculated values to the fuel injection valve 10 and the control valve 6. The valve opening period of control valve 6 is determined by the ratio of the on state period to the pulse separation of a signal synchronous with the rotation of the engine 1, e.g. a pulse signal having each pulse generated at a predetermined crank angle of the engine 1, or a pulse signal having its pulses generated at constant time intervals.

The control valve 6 is energized by each of its driving pulses to open the air passage for a period of time corresponding to its calculated valve opening period value so that a quantity of supplementary air corresponding to the calculated valve opening period value is supplied to the engine through the air passage 8 and the intake pipe 3.

The fuel injection valve 10 is energized by each of its driving pulses to open for a period of time corresponding to its calculated valve opening period value to inject fuel into the intake pipe 3. The ECU 9 operates so as to supply the engine 1 with an air/fuel mixture having a predetermined air-fuel ratio e.g. a theoretical air-fuel ratio.

When the valve opening period of the control valve 6 is increased to increase the quantity of supplementary air, an increased quantity of the mixture is supplied to the engine 1 to increase the engine output, resulting in an increase in the engine rpm, whereas a decrease in the valve opening period causes a corresponding decrease in the quantity of the mixture, resulting in a decrease in the engine rpm. In this manner, the engine speed is controlled by the control of the quantity of supplementary air or the valve opening period of the control valve 6.

Details of the idling rpm control operation of the idling rpm feedback control system constructed above, during deceleration, will now be described with reference to FIG. 1, already referred to and FIG. 2 and FIG. 4.

Figure 2:
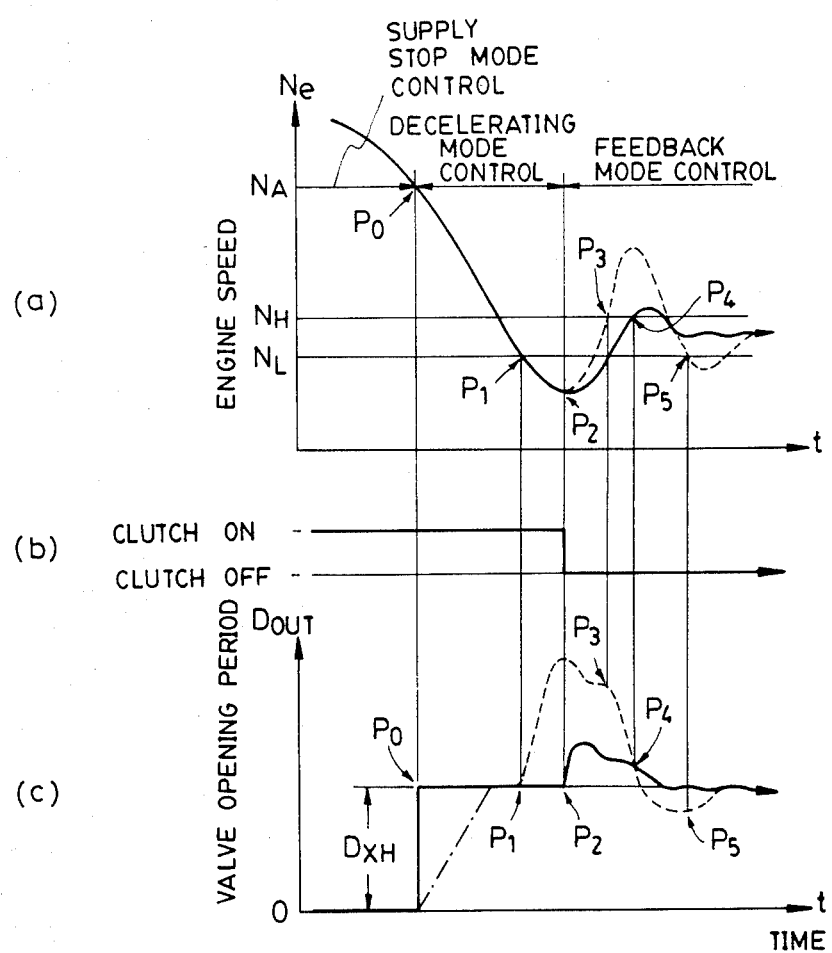
FIG. 2 is a timing chart showing the method of the invention.

As shown in FIG. 2, according to the invention, when the throttle valve 5 is fully closed to decelerate the engine so that the engine speed Ne decreases with the lapse of time, below a predetermined rpm NA (Po of FIG. 2), the control valve 6 is opened with a predetermined period DXH to allow supply of the supplementary air to the engine 1 through the air passage 8 to initiate control of the supplementary air quantity in decelerating mode in a manner as hereinafter described (FIG. 2 (a) and (c)). This valve opening period DXH is determined in dependence on the engine load at engine idling.

According to the manner of control of the quantity of supplementary air in decelerating mode shown in FIG. 2 (c), the control valve 6 is opened with the predetermined valve opening period DXH simultaneously when the engine rpm Ne drops below the predetermined rpm NA. Another control manner may alternatively be employed which is such that, as indicated by the chain line in FIG. 2 (c), when the engine rpm Ne drops to the predetermined rpm NA, the opening of the control valve 6 is initiated, and then the valve opening period is gradually increased with a further drop in the engine rpm, and is set to the predetermined valve opening period DXH when the engine rpm reaches the upper limit NH of the desired idling rpm range.

By supplying a predetermined quantity of supplementary air to the engine in advance at engine deceleration before the start of the idling rpm feedback control in the above manner, a sudden drop in the engine rpm and accordingly engine stall can be prevented even if the clutch is disengaged during deceleration.

If the engine is normally operated by the driver with the clutch disengaged before the engine rpm Ne decreases to the upper limit NH of the desired idling rpm range, the control of supplementary air quantity is immediately initiated in feedback mode immediately upon the upper limit NH being reached. According to a typical manner of this feedback control, the valve opening period DOUT is varied in response to the difference between the upper and lower limits NH, NL of the desired idling rpm range and the actual engine rpm Ne sensed by the engine rpm sensor 14, so as to make the above difference zero.

That is, when the actual engine rpm Ne is between the upper limit NH and the lower limit NL, increase or decrease in the valve opening time DOUT is considered unnecessary and therefore, the valve opening period obtained in the previous loop is maintained. When the actual engine rpm Ne is higher than the upper limit NH of the desired idling rpm range, the difference between the actual engine rpm Ne and the upper limit NH is determined, and depending on this difference, the engine rpm is reduced by decreasing the valve opening period DOUT. On the other hand, if the actual rpm Ne is lower than the lower limit NL, the difference between this lower limit NL and the actual rpm Ne is determined, and depending on this difference, the valve opening period DOUT is increased so as to increase the engine rpm. In this way, the engine rpm is controlled and maintained between the upper and lower limits NH and NL of the desired idling rpm range.

Figure 3:
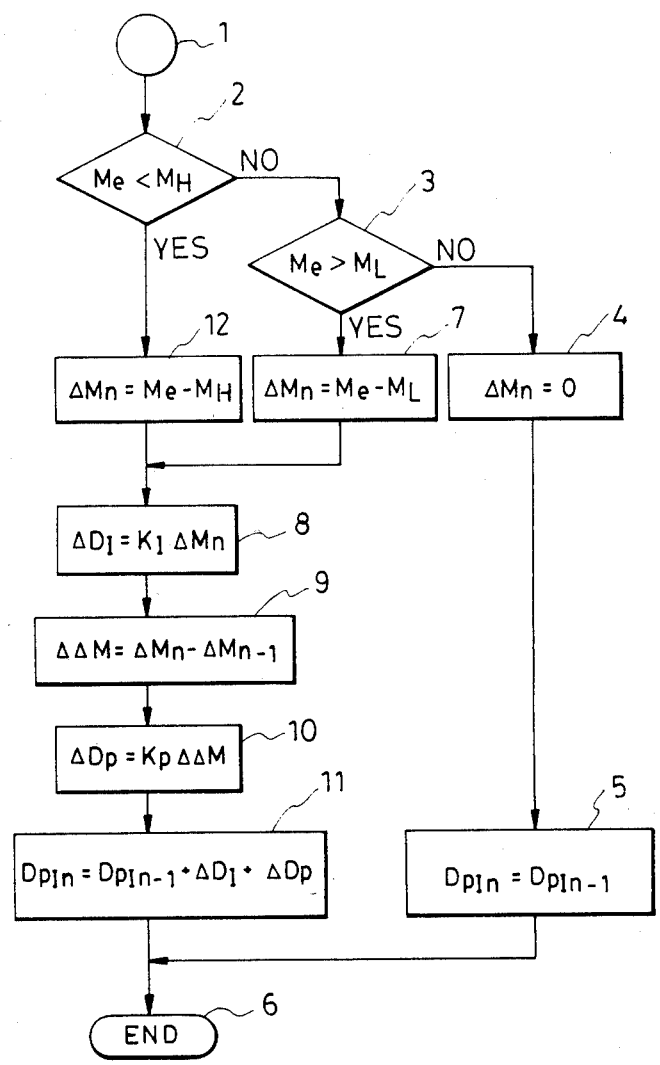
FIG. 3 is a flow chart showing a program routine for calculating the valve opening period of the control valve for controlling the supplementary air quantity, executed inside the electronic control unit (ECU) in FIG. 1.

As explained hereinabove, the control valve opening period DOUT is determined by the following equation:

$$DOUT = DPIN + DE \quad (1)$$

where DPIN represents a feedback term which is determined by the routine shown in the flow chart of FIG. 3 and executed by the ECU 9, and DE represents an electrical load term and has a predetermined value dependent upon the engine load created by the electrical device 15.

The program concerned is called at the step 1 in FIG. 3, and then it is determined whether or not a value Me which is proportional to the reciprocal of the actual engine rpm is smaller than a value MH that corresponds to the upper limit NH of the desired idling rpm range, at the step 2. In the ECU 9, for the purpose of processing, the values Me and MH are substituted in place of the values Ne and NH, respectively. These values Me and MH (as well as ML, MH, etc. which will be described later) correspond to the time interval between adjacent pulse signals generated in synchronism with the rotation of the engine, which interval varies with the engine rpm. That is, the larger the engine rpm, the smaller the value Me becomes. If the answer to the question of the step 2 is negative, that is, Ne≦NH, the program proceeds to the step 3, where it is determined whether or not the value of Me is larger than the value of ML, which corresponds to the reciprocal of the lower limit NL of the desired idling rpm range. If the answer to the question of the step 3 is negative, that is, if as a result of the determinations of the steps 2 and 3, the actual engine rpm is found to be between the upper and lower limits NH and NL of the desired idling rpm range, the difference ΔMn between the value Me and the values MH, ML is set to zero at the step 4, since it is then not necessary to either increase or decrease the actual engine rpm Ne. Then, the value of the feedback mode term DPIN is set to a value DPIN−1 obtained in the preceding loop, at the step 5, followed by terminating the execution of the present loop, at the step 6.

If the determination of the step 3 gives an affirmative answer or yes, it is determined that the actual engine rpm Ne is smaller than the lower limit, NL, and then the value of the difference ΔMn (which then assumes a positive value) is calculated, at the step 7. This value ΔMn is then multiplied by a constant KI to obtain an integral control term value ΔDI, at the step 8. Then, the difference between the difference value ΔMn calculated at the step 7 and the same value ΔMn−1 obtained in the previous loop, that is, the acceleration differential value ΔΔMn, is calculated at the step 9. This acceleration differential value ΔΔMn is multiplied by a constant Kp to obtain a proportional control term value ΔDP at the step 10. The integral control term value DI and the proportional control term value ΔDP, are added to the aforementioned feedback control term value DPIN to obtain a feedback control term value DPIN as an up-to-date value, at the step 11. Then, the execution of the program is terminated at the step 6.

If the answer to the question of the step 2 is affirmative or yes, it is determined that the actual engine rpm Ne is larger than the upper limit NH of the desired idling rpm range, and at the step 12, the above differential value ΔMn is calculated at the step 12, which then assumes a negative sign. Thence, the integral control term value ΔDI, the proportional control term value ΔDP, and the present loop feedback control term value DPIN are calculated, respectively, at the steps 8, 10 and 11, followed by termination of the execution of the program.

Prompt control of the idling rpm can be performed in a stable manner by the above described manner of determination of the valve opening period DOUT based upon the integral and proportional control term values and the provision of the desired idling rpm range defined by the upper and lower limits NH, NL.

Reverting now to FIG. 2, if the method of the present invention is not applied in the event that the engine rpm Ne drops below the upper limit NH of the desired idling rpm range with the clutch kept in engagement, the feedback mode control will take over from the time the engine rpm reaches the upper limit NH. In fact, since the desired idling rpm range defined as between the upper and lower limits NH and NL, as explained with reference to FIG. 3, is an insensitive range where no change in the supplementary air quantity occurs by means of feedback, the valve opening period DOUT of the control valve 6 remains unchanged as long as the engine rpm Ne is within this desired idling rpm range. That is, the valve opening period DOUT starts increasing from the moment the engine rpm Ne falls below the lower limit NL of the desired idling rpm range (the point Pl in FIG. 2 (a) and (c)). Even though the control valve opening period DOUT is increased in feedback mode, the engine rpm Ne decreases in proportion to a decrease in the vehicle speed, as the clutch remains in proper engagement (the solid line P1–P2 in FIG. 2 (a) and the dotted line in FIG. 2 (c)). As a result, the valve opening period DOUT of the control valve 6 is increased with a decrease in the engine rpm proportional to a decrease in the vehicle speed. The valve opening period DOUT thus increased will be very large as compared with the valve opening period DXH necessary to maintain the engine rpm at the desired idling rpm (supposing that simply the period DXH during deceleration mode control is set as the desired value, for the purpose of simplification of explanation). In such a state, if the clutch disengages, there is a sudden drop in the engine load, causing the engine rpm Ne to increase very rapidly, and in some cases the engine rpm Ne overshoots or increases over the upper limit NH of the desired idling rpm range by a big margin (the dotted line P3 in FIG. 2 (a)). The extent of this overshoot will be very large if the control is applied to an internal combustion engine which is equipped with a control valve 6 capable of supplying supplementary air to the engine at large rates sufficient for a large engine load determined by the sizes of the headlights, heater/air conditioner, etc. When the engine rpm thus overshoots, the integral control term value ΔDI becomes negative to decrease the valve opening period DOUT rapidly from the moment the engine rpm Ne rises above the upper limit NH of the desired idling rpm range (the points P3 in FIG. 2 (a) and (c)). If the extent of overshoot is too large, the valve opening period DOUT can be decreased even below the desired value DXH (FIG. 2 (c)). As a result, the engine rpm Ne again drops, and when the engine rpm Ne decreases below the lower limit NL of the desired idling rpm range (the point P5 in FIG. 2 (a)), the valve opening period DOUT is now increased to a value close to the desired value DXH, so as to maintain the engine rpm within the desired idling rpm range (the point P5 in FIG. 2 (c)). In this manner, the engine rpm Ne is controlled so as to be stationary at the desired idling rpm.

In the above manner, if both disengagement of the clutch and a sudden and large increase in the engine rpm occur simultaneously, it not only can cause discomfort to the driver, but also can badly affect the fuel consumption and exhaust gas emission characteristics of the engine.

According to this invention, if the clutch remains engaged even after the engine rpm Ne has reached the upper limit NH of the desired idling rpm range the execution of the deceleration mode control is continued, and once the clutch disengagement signal turns on, feedback mode control is started (the points P2 in FIGS. 2 (a) and (c)). Therefore, according to this invention, when the feedback mode control is initiated, the valve opening period DOUT starts to increase from the value DXH, and accordingly the engine rpm Ne starts to increase so that the aforementioned, proportional control term value ΔDP becomes negative to allow the valve opening period DOUT. Thus, the engine rpm Ne can promptly be controlled to the desired idling rpm without an abrupt increase in the engine rpm.

Although according to a normal operating manner of the driver, the clutch can be disengaged before the transmission gear is changed to its neutral position, the driver can sometimes put the transmission gear into its neutral position before the clutch is disengaged or without disengaging same. Even in such a situation, the transmission means between the engine and the wheels is disengaged thereby reducing the engine load. Therefore, in view of such an operating manner, according to the invention, the feedback mode control is started when either the clutch disengagement signal turns on or a signal indicative of changing of the transmission gear to its neutral position turns on.

Figure 4:
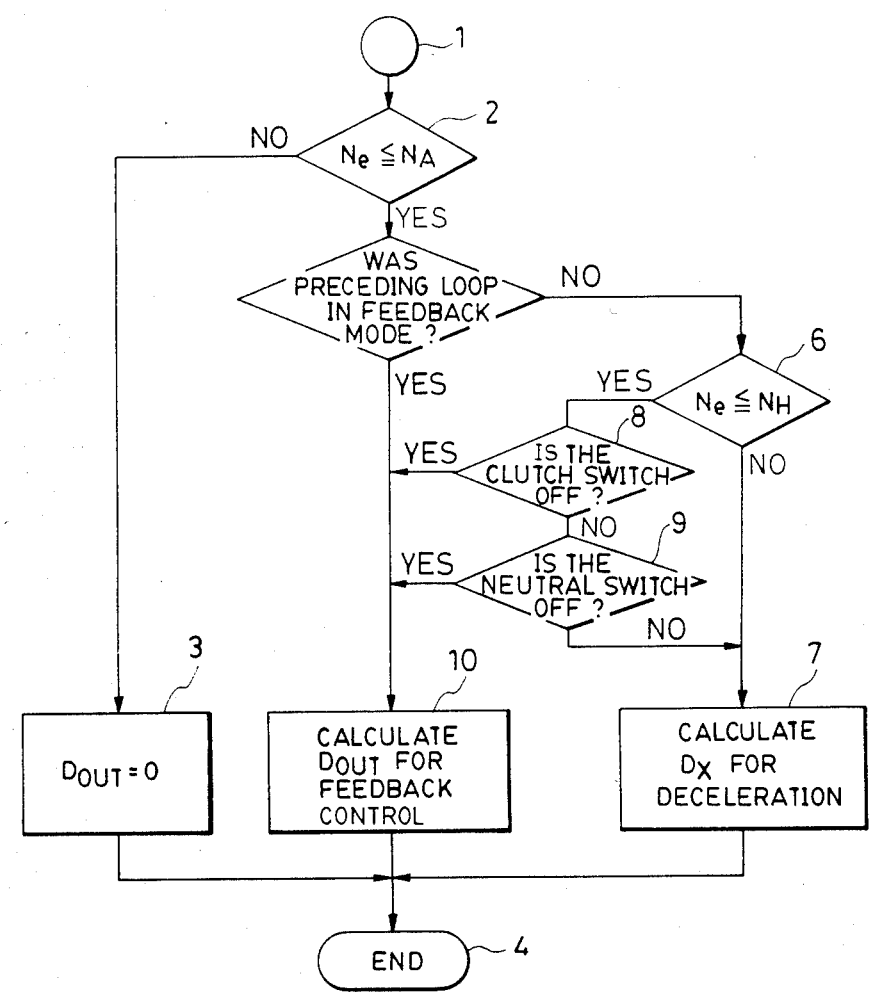
FIG. 4 is a flow chart showing a routine for carrying out the method of the invention, executed inside the ECU in FIG. 1.

FIG. 4 shows a flow chart of a routine for execution of the control manner of supplementary air quantity according to the invention as explained with reference to FIG. 2, which is executed within the ECU 9.

When the throttle valve 5 in FIG. 1 is fully closed, the present program is called (step 1 in FIG. 4). First, it is determined at the step 2 whether or not the engine rpm Ne is lower than the predetermined rpm NA. If the answer to the step 2 is negative, that is, if the engine rpm Ne is higher than the predetermined rpm Na at which there is no fear of engine stall, the program proceeds to the step 3 to set the valve opening period DOUT of the control valve 6 to zero, and the program is terminated (step 4). If the answer to the step 2 is affirmative, it is checked at the step 5 whether or not the preceding loop was executed in feedback mode. If the answer is no, the program proceeds to the step 6, where it is determined whether or not the engine rpm Ne is higher than the upper limit NH of the desired idling rpm range. If the engine rpm Ne is found to be higher than the value NH, it is judged that the engine is in a condition requiring deceleration mode control, and therefore the valve opening period DOUT of the control valve 6 is set to the predetermined value DXH for deceleration mode control, at the step 7, followed by termination of the program.

If, in the step 6, the answer is no, that is, the engine rpm Ne is found to be lower than the upper limit NH of the desired idling rpm range, the program proceeds to the step 8 and the step 9, where the on-off states of the clutch switch 19 and the neutral switch 20 in FIG. 1 are checked. If both of the switches generate "on" signals, calculation of the valve opening period DXH is continued in deceleration mode, at the step 7. In the steps 8 and 9, if either one of the signals is off, the program proceeds to the step 10, where the valve opening period DOUT of the control valve 6 is calculated in feedback mode, followed by termination of the program. In the above step 5, if the answer is yes, or in other words, if the preceding control loop was executed in feedback mode, it is judged not necessary to proceed to the step 6 to determine whether or not the engine rpm Ne is larger than the upper limit NH of the desired idling rpm, and the program directly proceeds to the step 10 to calculate the control valve opening period in feedback mode and the program is terminated.

Next, the electrical circuit in the ECU 9 will now be described by referring to FIG. 5 which illustrates an embodiment thereof.

The engine rpm sensor 14 in FIG. 1 is connected to an input terminal 902a of a one chip CPU (hereinafter merely called "CPU") 902 by way of a waveform shaper 901, both provided in the ECU 9. Reference numeral 15' represents sensor means for detecting the electrical loads of the electric devices 15 in FIG. 1, which are connected to respective ones of a group of further input terminals 902b of the CPU 902 by way of a level shifter 904 in the ECU 9. Numerals 19 and 20 designate the clutch switch and the neutral switch connected in series to the ECU. These are also connected to the input terminals 902b of the CPU 902 through the level shifter 904. The water temperature sensor 13 and the throttle valve opening sensor 17 are connected, respectively, to input terminals 905a and 905b of an analog-to-digital converter 905 and are also both connected to the input of a fuel supply control unit 903. The analog-to-digital converter 905 has an output terminal 905c connected to the input terminals 902b of the CPU 902 and a group of further input terminals 905d connected to a group of output terminals 902c of the CPU 902. A pulse generator 906 is connected to another input terminal 902d of the CPU 902 which in turn has an output terminal 902e connected to an AND circuit 908 at one of its input terminals, by way of a frequency divider 907. The AND circuit 908 has its output connected to a clock pulse input terminal CK of a down counter 909. The AND circuit 908 has its other input terminal connected to a borrow output terminal $\overline{B}$ of the down counter 909 which terminal is further connected to the solenoid 6a of the control valve 6 in FIG. 1, by way of a solenoid driving circuit 911. The CPU 902 has another group of output terminals 902f, one of which is connected to a load input terminal L of the down counter 909.

The analog-to-digital converter 905, the CPU 902, and the down counter 909 are connected together by way of a data bus 912, respectively, at an output terminal 905e, an input and output terminal 902g, and an input terminal 909a.

Connected to the fuel supply control unit 903 are the absolute pressure sensor 12 and the other engine parameter sensors 18 such as an atmospheric pressure sensor, all appearing in FIG. 1. The output of the fuel supply control unit 903 is connected to the fuel injection valve 10 in FIG. 1.

The electrical circuit of the ECU 9 constructed as above operates as follows: An output signal from the engine rpm sensor 14 is supplied to the ECU 9 as a signal indicative of the engine rpm Ne as well as a signal indicative of a predetermined crank angle of the engine 1 (top dead center (TDC)-synchronized signal), where it is subjected to waveform shaping by the waveform shaper 901 and then supplied to the CPU 902 and the fuel supply control unit 903. Upon being supplied with this top dead center signal, the CPU 902 generates a chip selecting signal, a channel selecting signal, an analog-to-digital conversion starting signal, etc., the latter commanding the analog-to-digital converter 905 to convert analog signals such as the engine cooling water temperature signal and the throttle valve opening signal from the cooling water temperature sensor 13 and the throttle valve opening sensor 17 respectively into corresponding digital signals. The digital signals indicative of the cooling water temperature and the throttle valve opening from the converter 905 are supplied as data signals to the CPU 902 via the data bus 912 when a sighal indicative of termination of each analog-to-digital conversion is supplied to the CPU 902 from the output terminal 905c of the analog-to-digital converter 905. Upon completion of conversion and supply of one of these digital signals to the CPU 902, the same process as above is repeated to cause inputting of the other digital signals to the CPU 902. Further, an electrical load indicative signal from the electrical load sensor means 15 has its voltage level shifted to a predetermined level by the level shifter 904 and then applied to the CPU 902. During deceleration of the engine with the throttle valve fully closed, when at least one of the clutch means and the transmission gear is disengaged, an off-signal is inputted to the CPU 902 by either the clutch switch 19 or the neutral switch 20, via the level shifter 904 which changes the signals to a predetermined level.

The CPU operates on these input data signals, i.e. the engine rpm signal, the electrical load signal, the clutch switch position signal, the transmission gear neutral position signal, the cooling water temperature signal, and the throttle valve opening signal to determine which of the air supply-stop mode (step 3 in FIG. 4), the deceleration mode and the feedback mode should be selected. For example, if it is determined that the deceleration mode should be selected, the CPU 902 calculates the valve opening period DOUT (=DXH) of the control valve 6 in deceleration mode, and supplies the resulting calculated value to the down counter 909 via the data bus 912 upon a reading command signal being inputted to the down counter 909 through its load input terminal L, which in turn starts counting clock pulses corresponding in number to the read calculated value.

On the other hand, a clock pulse generated by the pulse generator 906 is used as a timing signal for the control operation carried out by the CPU 902, and at the same time it is subjected to frequency division by the frequency divider 907 into a suitable frequency and then supplied to one input terminal of the AND circuit 908.

When the down counter 909 is supplied with a starting command signal from the CPU 902, it is loaded with a calculated value indicative of the desired valve opening period DOUT of the control valve 6, and at the same time it generates a high level output of 1 at its borrow output terminal $\overline{B}$ and applies it to the other input terminal of the AND circuit 908 as well as the solenoid driving circuit 911. The solenoid driving circuit 911 energizes the solenoid 6a of the control valve 6 to open same as long as it is supplied with the above high level output of 1 from the down counter 909.

As long as the AND circuit 908 has its other input terminal supplied with the above high level output of 1 from the down counter 909, it allows clock pulses supplied thereto through its one input terminal to be applied to the clock pulse input terminal CK of the down counter 909. The down counter counts the clock pulses, and upon counting up to a number corresponding to the calculated value of the valve opening period DOUT supplied thereto from the CPU 902, it generates a low level output through its borrow output terminal $\overline{B}$ to cause the solenoid driving circuit 911 to deenergize the solenoid 6a of the control valve 6. At the same time, the above low level output of the down counter 909 is supplied to the AND circuit 908 as well, to interrupt the supply of further clock pulses to the down counter 909.

Figure 5:
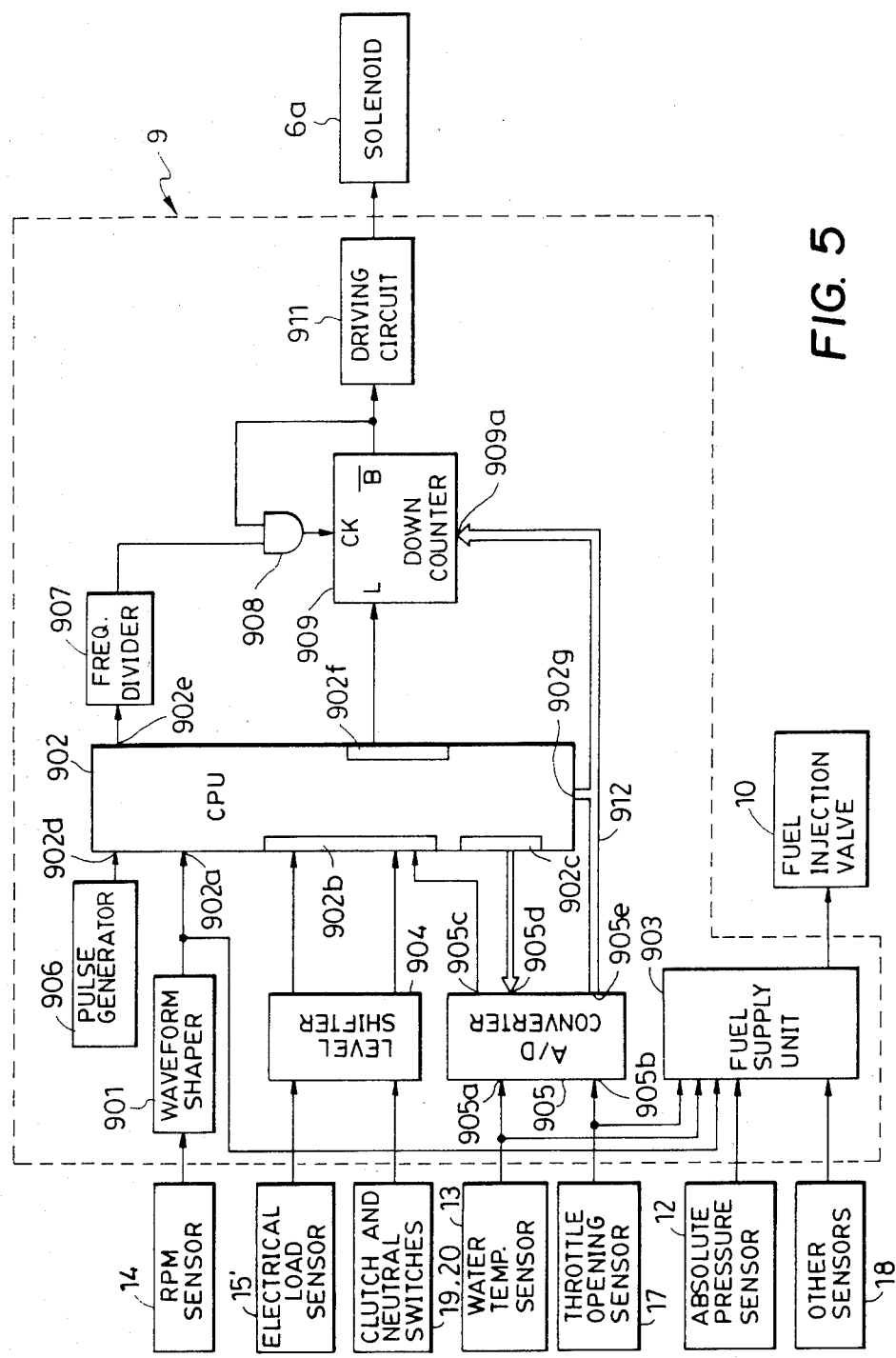
FIG. 5 is a circuit diagram illustrating the electrical circuit within the ECU in FIG. 1.

The electrical circuit of FIG. 5 operates in a manner similar to that described above also when the CPU 902 determines that the idling rpm feedback control should be carried out, and description of which is therefore omitted.

When the CPU 902 judges that the supplementary air supply-stop mode should be applied, the CPU 902 supplies no starting signal to the down counter 909 to keep the solenoid driving circuit 911 inoperative to maintain the control valve 6 fully closed.

On the other hand, the fuel supply control unit 903 operates on engine operation parameter signals supplied from the engine rpm sensor 14, the engine cooling water temperature sensor 13, the throttle valve opening sensor 17, the absolute pressure sensor 12 and the other engine operation parameter sensors 18, to calculate a desired value of fuel supply quantity so as to keep the air/fuel ratio of the mixture being supplied to the engine 1 at an optimum value, e.g. a theoretical air/fuel ratio, and to open the fuel injection valve 10 for a period of time corresponding to the calculated value.

What is claimed is:

1. In a method for controlling the quantity of supplementary air being supplied to an internal combustion engine for a vehicle having wheels, said enging having:
   an intake passage,
   a throttle valve arranged in said intake passage,
   an air passage having one end communicating with said intake passage at a location downstream of said throttle valve and another end communicating with the atmosphere, respectively,
   said supplementary air being supplied to said engine through said air passage and said intake passage, and
   power transmission means for transmitting torque from said engine to said wheels of said vehicle,
   wherein (i) the quantity of said supplementary air is controlled in a predetermined deceleration mode control manner when said engine is decelerating with said throttle valve fully closed and from the moment the engine rpm becomes lower than a first predetermined rpm until it reaches a second predetermined rpm, which is an upper limit of a desired idling rpm range and lower than said first predetermined rpm, so as to prevent a sudden drop in the engine rpm even if said power transmission means is disengaged during the deceleration of said engine, and
   (ii) the quantity of said supplementary air is controlled in a feedback mode control manner responsive to the difference between the actual engine rpm and desired engine rpm once the engine rpm has reached said second predetermined rpm,
   the improvement comprising the steps of:
   (a) determining whether or not said power transmission means is in a state of engagement;
   (b) continuing said control of the quantity of said supplementary air in said predetermined deceleration mode control manner, as long as said power transmission means is maintained in said state of engagement even after the engine rpm has reached said second predetermined rpm while said engine is controlled in said predetermined deceleration mode control manner, to thereby prevent a sudden increase in the engine rpm upon disengagement of said power transmission means after said second predetermined rpm has been reached; and
   (c) starting said control of the quantity of said supplementary air in said feedback mode control manner, immediately when said power transmission means is disengaged.

2. A method as claimed in claim 1, wherein said power transmission means includes a clutch, said step (a) comprising determining whether or not said clutch is in a state of engagement.

3. A method as claimed in claim 1, wherein said power transmission means includes a transmission gear, said step (a) comprising determining whether or not said transmission gear is in a state of engagement.

4. A method as claimed in claim 1, wherein said power transmission means includes a clutch and a transmission gear, said step (a) comprising determining whether or not either one of said clutch and said transmission gear is in a state of engagement.

5. A method as claimed in claim 1, wherein said control of the quantity of said supplementary air in said predetermined deceleration mode control manner comprising starting supplying said supplementary air to said engine at a predetermined rate, from the moment the engine rpm reaches said first predetermined rpm.

6. A method as claimed in claim 1, wherein said control of the quantity of said supplementary air in said predetermined deceleration mode control manner comprising starting supply of said supplementary air to said engine at a rate gradually increasing with a decrease in the engine rpm, from the moment the engine rpm reaches said first predetermined rpm, and maintaining the rate of supply of said supplementary air at a predetermined rate when the engine rpm further decreases to said second predetermined rpm.

* * * * *